Aug. 30, 1955  C. N. BERGSTROM  2,716,518
PAPER MILK CONTAINER WITH CREAM SEPARATING ATTACHMENT
Filed July 28, 1954  2 Sheets-Sheet 1
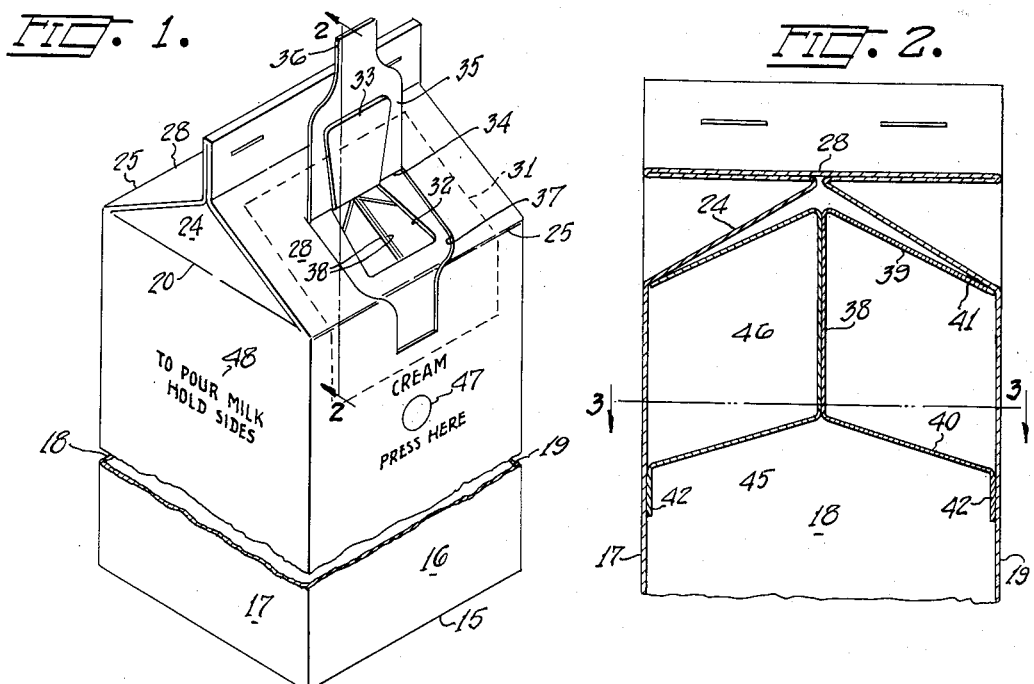
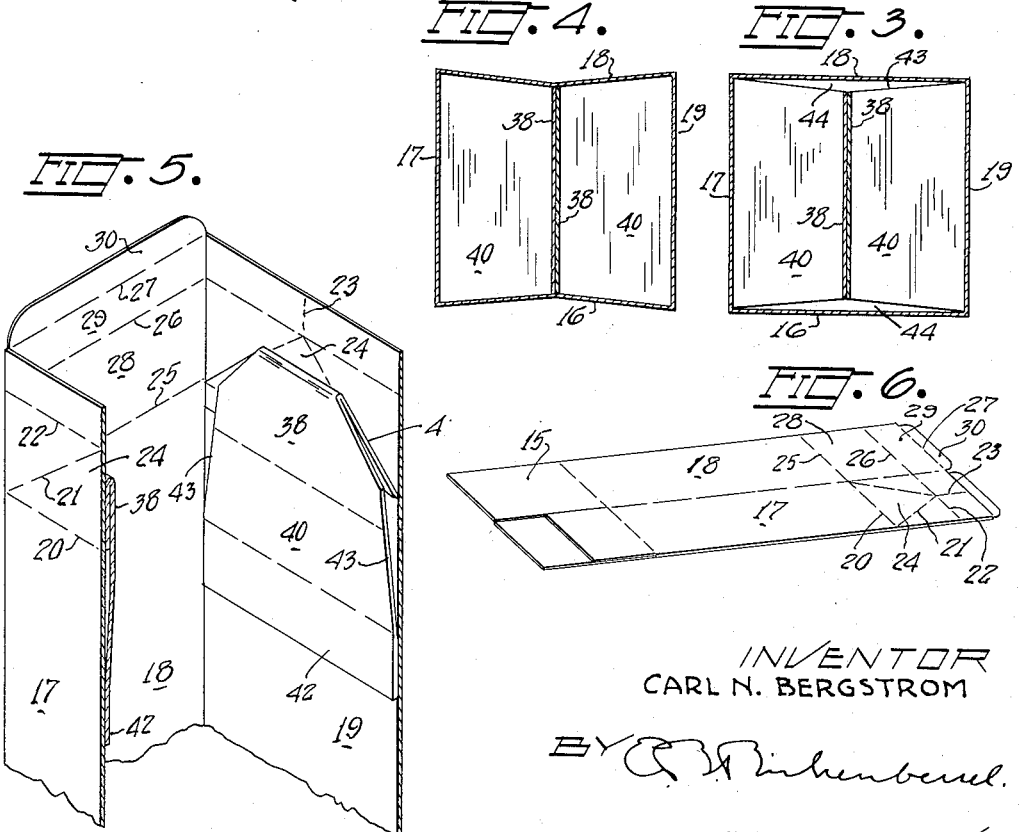
INVENTOR
CARL N. BERGSTROM
ATTORNEY Aug. 30, 1955     C. N. BERGSTROM     2,716,518
PAPER MILK CONTAINER WITH CREAM SEPARATING ATTACHMENT
Filed July 28, 1954     2 Sheets-Sheet 2
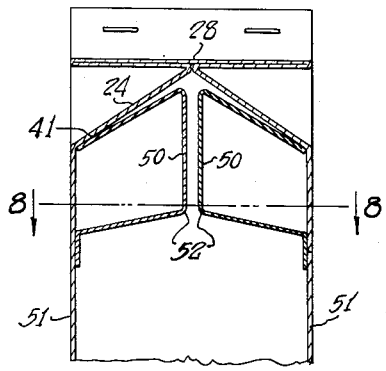
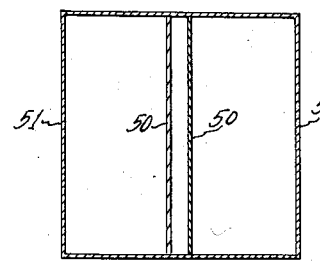
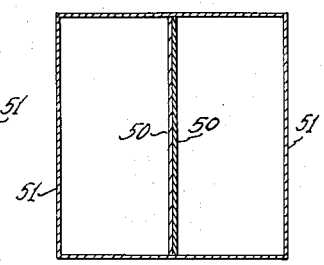
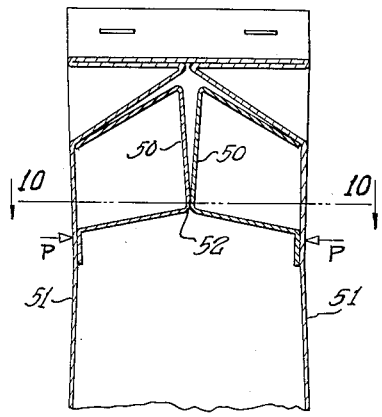
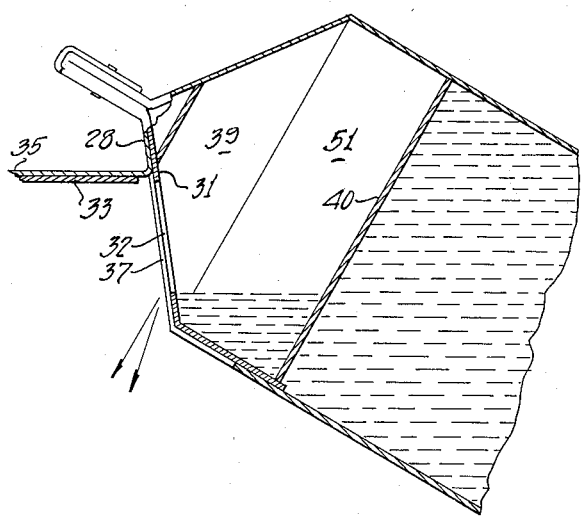
INVENTOR
CARL N. BERGSTROM
BY
ATTORNEY

United States Patent Office 2,716,518
Patented Aug. 30, 1955

2,716,518

PAPER MILK CONTAINER WITH CREAM SEPARATING ATTACHMENT

Carl N. Bergstrom, Portland, Oreg.

Application July 28, 1954, Serial No. 446,260

4 Claims. (Cl. 229—7)

This invention relates generally to containers for vending milk and particularly to a paper milk container with cream separating attachment.

The main object of this invention is to provide a paper container for milk which will not differ radically from the construction of containers now in common use and, at the same time, construct same in a manner to afford a means for easily separating the milk and cream contents thereof.

The second object is to introduce into existing paper milk containers a separator which will not interfere with, or slow down the filling operation.

The third object is to produce a separator which will make it possible to selectively control the delivery of milk by pressing one or the other of the two pairs of opposite sides.

The fourth object is to reenforce the container to prevent "bulging," which is a common defect in paper milk containers outside of refrigeration.

I accomplish these and other objects in the manner set forth in the following specifications as illustrated by the accompanying drawings, in which:

Figure 1 is a perspective foreshortened view of a conventional satchel fold milk container with the tab open to show pouring orifice and the separating attachment of the present invention;

Figure 2 is a fragmentary section taken along the line 2—2 in Figure 1;

Figure 3 is a plan section taken along the line 3—3 in Figure 2;

Figure 4 is a plan section similar to Figure 3 but showing the container sides pressed into contact with the interior partition;

Figure 5 is a perspective view of the container with parts broken away in section and showing the partitions folded against the sides;

Figure 6 is a perspective view showing the container folded;

Figure 7 is a vertical section similar to Figure 2, but showing an alternate construction;

Figure 8 is a fragmentary section taken along the line 8—8 in Figure 7;

Figure 9 is a vertical section similar to Figure 7, but showing pressure applied at P—P, whereby the partitions are moved toward each other to contact along the edges thereof;

Figure 9 is a fragmentary section taken along the line 10—10 in Figure 9; and

Figure 11 is a fragmentary section through a container showing how the cream is poured prior to pouring the milk.

Like numbers of reference refer to the same or similar parts throughout the several views.

Referring in detail to the drawing, there is shown a paper container comprised of a bottom 15 around which are the side walls 16, 17, 18 and 19. The side walls 17 and 19 have creases 20, 21, 22 and 23 formed therein to permit the triangular portions 24 to be folded inwardly. The side walls 16 and 18 are provided with creases 25, 26 and 27, which form the areas 28, 29 and 30, all of which are part of the satchel fold top portion of the commonly used form of paper milk bottle.

The side wall 16 is provided with a paper insert 31 in which is formed the pouring opening 32 whose closure 33 is hinged along the line 34, which is also the hinge line of the flap 35 which, together with the tab 36, occupies the opening 37 formed in one area 28. This outlet and closure is also in common use.

Referring now to my invention, it will be seen to consist of the simple addition of a pair of opposed flaps 38, each of which is supported by the opposed sides 17 and 19, respectively, by the double hinges 39 and 40. The hinge 39 is attached to the triangular portion 24 by means of the glue 41 and the hinge 40 is attached to the side 19 by means of the tab 42. The flaps 38 remain substantially in parallelism with each other and with the walls 17 and 19 at all times. It will be noted in Figures 3, 4 and 5 that the edges 43 of the hinges 40 are inclined away from the walls 16 and 18 when no pressure is applied to the sides 16 and 18 leaving a port or opening 44 at each side through which milk can flow from the milk compartment 45 under the hinges 40, past the cream compartment 46 and out of the opening 32.

It will be noted from the foregoing that if the user presses against the sides 16 and 18, as at the circle 47 indicated on the side 16, he can pour off whatever cream is present in the cream compartment 46, whereas if he holds the container by pressing against the areas 48 indicated on the sides 17 and 19, he can pour off whatever milk is within the milk compartment 45. In this manner the hinges 40 function as gates to open and close the space below them.

It will also be noted that the presence of the members 38, 39 and 40 does not interference with the ability of the bottle to fold to the flat form shown in Figure 6, in which paper bottles are introduced into the modern filling machines for paper milk bottles.

The separating attachment of the present invention is particularly adapted for use with milk containers constructed of paper or other inexpensive flexible material and provided with an inwardly foldable top, such as the satchel fold top shown in the drawings. Referring first to Figure 5, it is seen that the separating attachment is so positioned within the container that the flaps 38 each projects upwardly along the triangular portion 24 of the satchel fold top. Furthermore, it is to be noted that the edge joining the flap 38 and hinge 39 is wider than the adjacent portion of the triangle 24. This construction is provided in order to utilize the folding operation of the satchel fold top to move the cream separating attachment from its folded position against the side walls of the container (Figure 5) automatically to the unfolded position shown in Figure 2, as follows:

As is well known, automatic filling of the conventional type of milk container described hereinbefore is accomplished when the satchel fold top is completely open, as in Figure 5. A milk dispensing tube is lowered into the milk container and is then withdrawn as the filling operation is completed. The container is then conveyed to the folding machine where the first operation folds inwardly the triangular portions 24. As these triangular portions are folded inwardly, they engage the top hinges 39, if used, or the flaps 38. In either case, the flaps 38 are caused to be moved in substantially parallel relation away from the side walls 17, 19 toward the center of the container.

However, when the triangular portions 24 are completely folded but the sides 28 are not yet folded to their ultimate inward position, there is still a space between the opposed flaps 38. The next operation of the folding machine folds inwardly the sides 28 of the satchel fold top, and as these sides are folded inwardly they engage the ends of the hinge edges separating the flaps 38 and upper hinge 39, it being remembered that this edge is made somewhat longer than the corresponding width of the triangular portion 24. Thus, as the sides 28 are folded inwardly after contacting the said edges, the flaps 38 are moved downwardly out of contact with the triangular portions 24 to the position at which the gate members 40 are in positive sealing contact, as shown in Figure 2. The satchel fold top is then secured in folded condition by stapling the sections 30 together, as indicated in Figures 1 and 2.

In the alternative form shown in Figures 7 to 11, the same mechanism is employed except that the flaps 50 are substantially parallel and spaced when no pressure is applied to the side walls 51, permitting milk to flow between the flaps 50 while a reverse condition is illustrated in Figure 9, in which pressure is exerted at the points "P" on the side walls 51, causing the flaps 50 to contact along their edges 52 allowing only cream to flow from the container. It will be noted that here the application of pressure when drawing cream is 90° away from the direction indicated for cream in Figures 1 to 6. The operation of the two forms of the container is otherwise similar.

From the foregoing, it is apparent that the cream separating attachment of the present invention is particularly adapted for use with milk containers having an inwardly foldable top, such as the conventional satchel fold top, since the folding operations in sealing this top are utilized to move the separating attachment automatically into operating position.

The present invention is not in the paper milk container but in the improved form which makes possible the selective pouring of milk or cream and which reenforces the transverse shape of the bottle.

Having now described my invention and the manner in which the same may be used, what I claim as new and desire to secure by Letters Patent is:

1. In a milk container having opposed pairs of flexible side walls and an inwardly foldable top including at least one section hingedly secured to one of said side walls, a cream separator comprising gate means hingedly secured along the bottom edge transversely to the inner surface of at least one of the side walls to which a top section is hingedly secured, a spaced distance below the foldable top and pivotable between elevated position adjacent the container side wall and lowered position transversely of the container, the gate means being so proportioned that when in said lowered position it divides the container into upper and lower compartments, at least one edge of the gate means being tapered inwardly intermediate its end to form a bypass between the lowered gate means and the adjacent container wall of the other opposing pair of side walls, and actuator means hingedly connected at its lower end to the gate means and extending upwardly therefrom for engagement at its upper end with the foldable top section which is hinged to the same side wall as the gate means, the actuator means thereby being movable vertically by movement of the foldable top, the combined length of the associated top section and actuator means being greater than the length of the gate means which is hingedly connected to the same side wall as the corresponding top section, and the actuator means being proportioned in length sufficient to move the gate means into said lowered position upon inward folding of the container top, said bypass being subject to closing under inward pressure against the side walls of the container adjacent the tapered edges of the gate means to seal the said upper and lower compartments from each other, the container having a pouring spout disposed above the lowered position of the gate means, whereby to permit removal of the contents of the upper compartment when the said bypass is closed.

2. In a milk container having opposed pairs of flexible side walls and an inwardly foldable top including opposed pairs of top sections hingedly secured to said side walls, a cream separator comprising a pair of gate members, each hingedly secured along its bottom edge transversely to the inner surface of each of the side walls, respectively, of one opposing pair a spaced distance below the foldable top and pivotable between elevated position adjacent the container side wall and lowered position transversely of the container, the gate members being so proportioned that when in said lowered position they abut along their adjacent edges to divide the container into upper and lower compartments, at least one edge of the gate members being tapered inwardly to form a bypass between the lowered gate members and the adjacent container wall of the other opposing pair of side walls, and actuator means hingedly connected at its lower end to each of the gate members and extending upwardly therefrom for engagement at its upper end with the foldable top section which is hinged to the same side wall as the gate member, the actuator means thereby being movable vertically by movement of the foldable top, the combined length of the associated top section and actuator means being greater than the length of the associated gate member which is hingedly connected to the same side wall as the corresponding top section, and the actuator means being proportioned in length sufficient to move the gate members into said lowered position upon inward folding of the container top, the said bypass being subject to closing under inward pressure against the side walls of the container adjacent the tapered edges of the gate members to seal the said upper and lower compartments from each other.

3. In a milk container having opposed pairs of flexible side walls and a satchel fold top including a first pair of inwardly foldable opposed sections and a second pair of inwardly foldable opposed sections disposed substantially normal to the first pair and each hingedly secured to the container side walls, a cream separator comprising a pair of gate members each hingedly secured along its bottom edge transversely to the inner surface of each of the side walls, respectively, of one opposing pair a spaced distance below the foldable top and pivotable between elevated position adjacent the container side wall and lowered position transversely of the container, the gate members being so proportioned that when in said lowered position they abut along their adjacent edges to divide the container into upper and lower compartments, at least one edge of the gate members being tapered inwardly to form a bypass between the lowered gate members and the adjacent container wall of the other opposing pair of side walls, and an actuator member hinged at its bottom end to the other end of each gate member and extending upwardly therefrom, the actuator members being engagable by the first and second pairs, successively, of the satchel fold sections during inward folding of the latter, whereby to pivot the gate members downward, the combined length of the first engaging top section and associated actuator member being greater than the length of the associated gate member which is hingedly connected to the same side wall as the corresponding top section, and the actuator members being proportioned in length sufficient to move the gate members into said lowered position upon inward folding of the container top, the said bypass being subject to closing under inward pressure against the side walls of the container adjacent the tapered edges of the gate members to seal the said upper and lower compartments from each other.

4. A milk container having opposed pairs of flexible side walls and an inwardly foldable top, a pair of upright flaps normally in face contacting relation with each other within the upper portion of the container along the vertical axis of the container, said flaps being attached to opposed side walls by double hinged members, one at the upper and lower end of each flap and each lower hinged member extending the full width of the container along its line of attachment to the side walls, at least one edge of the lower hinged members curving slightly away from the adjacent side wall of the other opposing pair for the purpose of providing a bypass around said lower hinged members, said bypass being subject to closing under inward pressure against the side wall adjacent the bypass, whereby the lower hinged members function to divide the container into upper and lower compartments sealed from each other.

References Cited in the file of this patent

UNITED STATES PATENTS 2,365,739  Williamson _____ Dec. 26, 1944